United States Patent
Knehr-McLaren et al.

(10) Patent No.: US 7,044,380 B2
(45) Date of Patent: May 16, 2006

(54) METHODS, SYSTEMS AND COMPUTER PROGRAM PRODUCTS FOR COMMUNICATING PRODUCT STATUS INFORMATION

(75) Inventors: David G. Knehr-McLaren, Apex, NC (US); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 10/646,963

(22) Filed: Aug. 22, 2003

(65) Prior Publication Data

US 2005/0040220 A1    Feb. 24, 2005

(51) Int. Cl.
*G06K 7/10* (2006.01)
(52) U.S. Cl. .................. 235/462.01; 235/375
(58) Field of Classification Search .............
235/462.01–426.48, 472.01, 472.02, 472.03, 235/454, 455, 375, 378, 383, 380
See application file for complete search history.

(56) References Cited

U.S. PATENT DOCUMENTS

| | | | |
|---|---|---|---|
| 4,323,773 A | 4/1982 | Carpenter | 235/473 |
| 5,306,466 A | 4/1994 | Goldsmith | 422/58 |
| 5,426,280 A | 6/1995 | Smith | 219/506 |
| 5,869,341 A | 2/1999 | Woodaman | 436/1 |
| 6,134,114 A * | 10/2000 | Ungermann et al. | 361/737 |
| 2002/0087362 A1* | 7/2002 | Cobb et al. | 705/3 |
| 2002/0160661 A1* | 10/2002 | Florescu | 439/630 |
| 2002/0188259 A1* | 12/2002 | Hickle et al. | 604/189 |
| 2003/0080191 A1* | 5/2003 | Lubow et al. | 235/462.01 |
| 2003/0155415 A1* | 8/2003 | Markham et al. | 235/376 |
| 2005/0044171 A1* | 2/2005 | Bechtel et al. | 709/217 |
| 2005/0114193 A1* | 5/2005 | Kroening | 705/8 |

* cited by examiner

*Primary Examiner*—Thien M. Le
(74) *Attorney, Agent, or Firm*—Myers Bigel Sibley & Sajovec; Martin J. McKinley

(57) ABSTRACT

Methods of communicating product status information include maintaining a record of a product identification string associated with a product of a user, the product identification string being associated with a corresponding batch of the product. A batch status request is transmitted to a directory service maintaining batch status information at selected intervals and/or responsive to a user request and the requested batch status information for the product is received. The batch status request need not include personal information of the user. Related directory services, systems and computer program products are also provided.

34 Claims, 8 Drawing Sheets

METHODS, SYSTEMS AND COMPUTER PROGRAM PRODUCTS FOR COMMUNICATING PRODUCT STATUS INFORMATION

FIELD OF THE INVENTION

The present invention relates to information systems and more particularly to product status information systems.

BACKGROUND OF THE INVENTION

Information Technology (IT) systems, methods and computer program products, including, for example, computer networks, have grown increasingly commonplace, both in the business and home environment. These systems are generally able to communicate using protocols, such as the Internet Protocol (IP) over a shared infrastructure with registered addresses referred to as the Internet and/or the world wide web. The spread of these communicatively coupled systems provides a channel for communication of information to both businesses and consumers that was previously unknown. In addition to acting as a news distribution channel, the Internet is being used for sales and marketing of a wide range of consumer products and services. In addition, the Internet is increasingly being used for registration of such products with the manufacturer and/or distributor of the product, particularly for software products that may be distributed to the consumer electronically over the Internet itself.

Products are typically sold to consumers in packing including a universal product code (UPC) bar code label. These UPC labels are commonly used, for example, at retail checkout points to determine the price of the product. The UPC label is an identifier associated with a product type and/or model. For example, all of the cartons for a particular brand and model of a television from a manufacturer will generally be placed in packaging having the same UPC label.

Additional uses for the UPC label in connection with cooking devices are described in U.S. Pat. No. 5,426,280 ("the '280 patent"). The '208 patent describes a microwave oven including a sensor to read a UPC bar code that identifies the food or food product being placed in the microwave oven. Based on the read UPC bar code, the microwave oven may activate the microwave cooking cycle based on a particular cooking program that is identified by the UPC bar code information.

One area of concern with consumer products is safety. If a manufacturer determines that products are defective, it may issue a recall for the affected products if the defect poses a safety risk to the consumer. One category of products where this is particularly common is with food products. The manufacturers typically identify the products affected by a batch number. A batch number may represent a particular day and/or shift of production of the product and/or may be associated with a particular batch of supplies used in producing the products. Notification of a recall is typically provided to the consumer by mass market communications (television and print news media) and/or by mailing of notification of the recall to consumers who have registered their purchased product by submitting identifying personal information to the manufacturer, for example, on a mailed product registration card or electronically over the Internet.

An alternative approach to notifying a consumer that a food product is defective is proposed in U.S. Pat. No. 5,869,341 ("the '341 patent"). As described in the '341 patent, a food contamination detector is provided by a special substrate on a bar code label attached to the product that renders the bar code label unreadable if the product is contaminated. A substrate reactive with food contaminants is required to provide the change in color affecting the ability to read the bar code label and the substrate is placed in contact with food juices from the product.

It has also been proposed to use a bar code label in connection with a microwave oven to detect ingredients of a product placed in the microwave oven in addition to cooking time for the product. For example, ingredients to which the consumer is allergic or which the consumer wishes to avoid eating, such as meat, may be determined based on the bar code information.

SUMMARY OF THE INVENTION

Embodiments of the present invention provide methods, systems and computer program products for communicating product status information including maintaining a record of a product identification string associated with a product of a user. The product identification string is associated with a corresponding batch of the product. A batch status request is transmitted to a directory service maintaining batch status information at selected intervals and/or responsive to a user request. The requested batch status information for the product is then received. The batch status request may include no personal information of the user.

In some embodiments of the present invention, the method further includes scanning a product label of the product to obtain the product identification string. The batch status request may be transmitted responsive to scanning of the product label. The record may only be maintained as a temporary record of the product identification string while transmitting the batch status request. The received batch status information may be communicated to the user. The batch status information may, for example, indicate a recall of the product and the user may be notified of the recall.

In other embodiments of the present invention, a plurality of records of product identification strings associated with a plurality of products of the user are maintained. The user may be registered with a trusted entity and batch status requests for the plurality of products may be transmitted to the trusted entity and the requested batch status information may be received from the trusted entity. The received batch status information may include a certification of the trusted entity and/or a signature of an inspecting authority generating the batch status information.

In further embodiments of the present invention, batch status requests for different ones of the products are transmitted to different entities and the requested batch status information is received for respective products from the different entities. The received batch status information may include a certification of the different entities and/or a signature of an inspecting authority generating the batch status information.

In some embodiments of the present invention, the product label is scanned using a consumer appliance. The consumer appliance may be a cooking appliance. A record of recalled products may be maintained at the cooking appliance and a product label may be scanned if a user attempts to cook the product in the cooking appliance. The user of the cooking appliance may then be notified of a recall if the user attempts to cook a recalled product in the cooking appliance. In some embodiments of the present invention, the consumer appliance is a food storage appliance and the user if notified if the batch status information indicates a recall of the product if the user attempts to store the product in the food storage appliance. The consumer product may also be an information appliance.

In other embodiments of the present invention, a plurality of machine readable labels associated with the products of the user are scanned at a purchase location. A sales receipt is generated that includes a machine readable label configured to allow retrieval of the product identification strings for the scanned plurality of machine readable labels. The machine readable label of the sales receipt may then be scanned to obtain the product identification strings for the scanned plurality of machine readable labels.

In further embodiments of the present invention, a user brand loyalty card and/or bank card is scanned at a purchase location. A plurality of machine readable labels associated with the products of the user is also scanned at a purchase location. The product identification strings for the scanned plurality of machine readable labels are associated with the scanned user brand loyalty card and/or bank card to allow retrieval of the product identification strings for the scanned plurality of machine readable labels. The user brand loyalty card may then be scanned to obtain the product identification strings for the scanned plurality of machine readable labels and/or the product identification strings for the scanned plurality of machine readable labels may be obtained from a provider of the bank card.

In other embodiments of the present invention, methods are provided for communicating product status information including receiving from a requestor a batch status request including a product identification string associated with a product of a user. The product identification string is associated with a corresponding batch of the product and includes no personal information of the user. A directory service including a plurality of records associating product identification strings with batch identifications for corresponding products is queried to obtain the requested batch status information. A product type has a plurality of associated product identification strings associated with different batches of the product type and the corresponding products are provided with a machine readable label including an associated one of the product identification strings. The obtained batch status information for the product is transmitted to the requester.

In further embodiments of the present invention, consumer appliances are provided including a scanner configured to obtain a product identification string from a product and a controller configured to determine batch status information for a scanned product based on the obtained product identification string. The controller may be configured to repeatedly verify batch status information for a scanned product. The consumer appliance may include a database including a plurality of records of product identification strings associated with a plurality of products of the user and the controller may be configured to determine batch status information for the plurality of products of the user based on the product identification strings.

In other embodiments of the present invention, directory services are provided including a plurality of records associating product identification strings with batch identifications for corresponding products. A product type has a plurality of associated product identification strings associated with different batches of the product type and the corresponding products are provided with a machine readable label including an associated one of the product identification strings. The product identification strings may be bar code values and the machine readable labels may be bar code labels. The records may further include status information associated with the different batches and the directory service may include an input interface configured to receive a batch status request from a user and to provide the status information to the user responsive to the received batch status request. The directory service may include records for products from different vendors or only records associated with products of a single vendor.

In further embodiments of the present invention, methods of communicating product status information include obtaining a product identification string of a product of a user. The product identification string is associated with a plurality of batches, one of which is associated with the product. A batch status request including the obtained product identification string is transmitted to a directory service maintaining batch status information. The requested batch status information for the product is received. The received batch status information includes information associated with the plurality of batches. The user is notified of received batch status information for respective ones of the plurality of batches.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
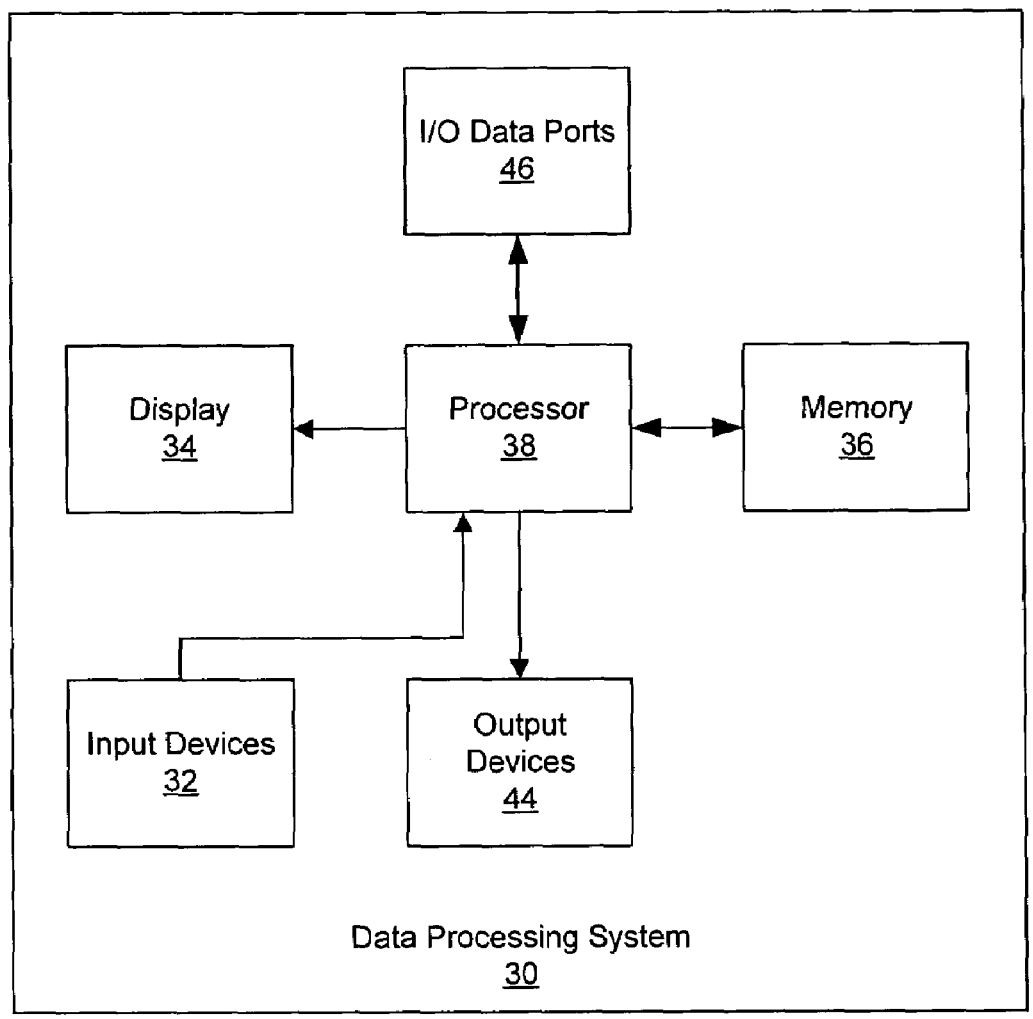
FIG. 1 is a block diagram of a data processing system suitable for use in a system according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention will now be described with reference to the figures. FIG. 1 illustrates an exemplary embodiment of a data processing system 30 suitable for communication of product status information in accordance with some embodiments of the present invention. The data processing system 30 may typically include input device(s) 32 such as an optical or radio frequency receiver (scanner), keyboard or keypad, a display 34, and a memory 36 that communicate with a processor 38. The data processing system 30 may further include a speaker 44 or other output device for notifying a consumer of a recall, and an I/O data port(s) 46, for example, an Ethernet or other interface supporting an Internet connection to send and/or receive batch status information or requests for the same, that also communicate with the processor 38. The I/O data ports 46 can be used to transfer information between the data processing system 30 and another computer system or a network. These components may be conventional components, such as those used in many conventional data processing systems, which may be configured to operate as described herein. While notifying a user of a recall or other status information is described above with reference to a speaker 44 or other output device of the illustrated system 30, it is to be understood that alternate contact information may be used, for example, calling a user's home or mobile telephone number.

Figure 2:
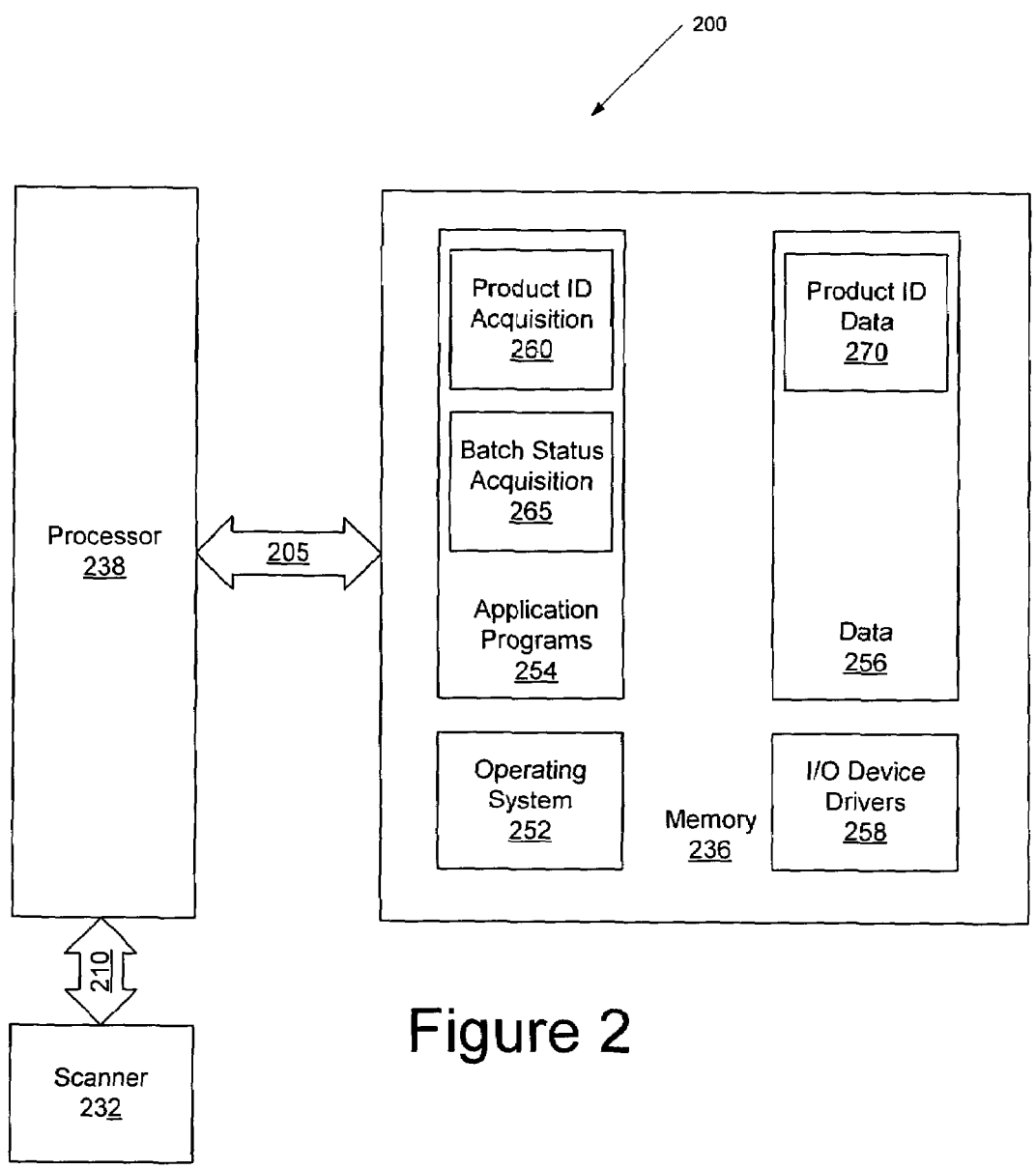
FIG. 2 is a more detailed block diagram of a consumer appliance system for communicating product status information according to some embodiments of the present invention.

FIG. 2 is a block diagram of data processing systems that illustrate consumer appliance systems, methods, and computer program products for communicating product status information in accordance with some embodiments of the present invention. The processor 238 communicates with the memory 236 via an address/data bus 205. The processor 38 can be any commercially available or custom microprocessor. The memory 236 is representative of the overall hierarchy of memory devices containing the software and data used to implement the functionality of the data processing system 200. The memory 236 can include, but is not limited to, the following types of devices: cache, ROM, PROM, EPROM, EEPROM, flash memory, SRAM, and DRAM.

As shown in FIG. 2, the memory 236 may include several categories of software and data used in the data processing system 200: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 46 and certain memory 236 components. The application programs 254 are illustrative of the programs that implement the various features of the data processing system 200 and preferably include at least one application which supports operations according to embodiments of the present invention. Finally, the data 256 represents the static and dynamic data used by the application programs 254, the operating system 252, the I/O device drivers 258, and other software programs that may reside in the memory 236.

As is further seen in FIG. 2, the application programs 254 may include a product identification (ID) acquisition module 260 and/or a batch status acquisition module 265. The product ID acquisition module 260 may carry out the operations described herein for obtaining a product identification string, such as bar code information, from a product label, such as a UPC bar code label or RF tag (i.e., a radio frequency transmitter attached to the product that transmits the product identification string), using the scanner 232. Thus, the product ID acquisition module 260 alone or in combination with a component of the data 256 provides a means for maintaining a record of product identification strings associated with products of a user. As will be described further herein, the product identification strings are associated with a corresponding batch of the product as contrasted with the prior art UPC labels, which are typically simply associated with a brand and/or model of a product without distinction between batches of that brand and/or model of product.

The batch status acquisition module 265 may carry out the operations described herein for transmitting a batch status request to a directory service at selected intervals and/or responsive to a user request and for receiving the requested batch status information responsive to the request. Thus, the system 200, including the modules 260 and 265 and the scanner 232 provide a consumer appliance including a scanner 232 configured to obtain a product identification string from a product and a controller 236, 238 configured to determine batch status information for a scanned product based on the obtained product identification string. The controller 236, 238 may be configured to repeatedly verify batch status information for a scanned product.

As illustrated in FIG. 2, the data 256 includes product ID data 270. The product ID data 270 may be used to maintain product identification strings associated with products of a user. A product identification string, in some embodiments of the present invention, is maintained only temporarily in the product ID data 270 while transmitting a batch status request. In other embodiments, the product ID data 270 may maintain a plurality of records of product identification strings associated with a plurality of products of the user and the controller 236, 238 may be configured to determine batch status information for the plurality of products of the user based on the product identification strings at designated times/intervals.

While the present invention is illustrated, for example, with reference to the product ID acquisition module 260 being an application program in FIG. 2, as will be appreciated by those of skill in the art, other configurations may also be utilized while still benefitting from the teachings of the present invention. For example, the product ID acquisition module 260 may also be incorporated into the operating system 252, the I/O device drivers 258 or other such logical division of the data processing system 200. Thus, the present invention should not be construed as limited to the configuration of FIG. 2 but is intended to encompass any configuration capable of carrying out the operations described herein.

The scanner 232 is coupled to the processor 238 over the bus 210. While the present invention is generally discussed herein by reference to bar code labels, it is to be understood that other types of machine readable identifications on a product are also encompassed within the scope of the present invention, for example, magnetically encoded labels, such as magnetic ink character recognition (MICR) coding. Accordingly, the term "scanner" as used herein is not limited to a particular type of optical and/or magnetic reader, radio frequency (RF) receiver and the like and is intended to encompass any input device configured to obtain identification information from a product.

Figure 3:
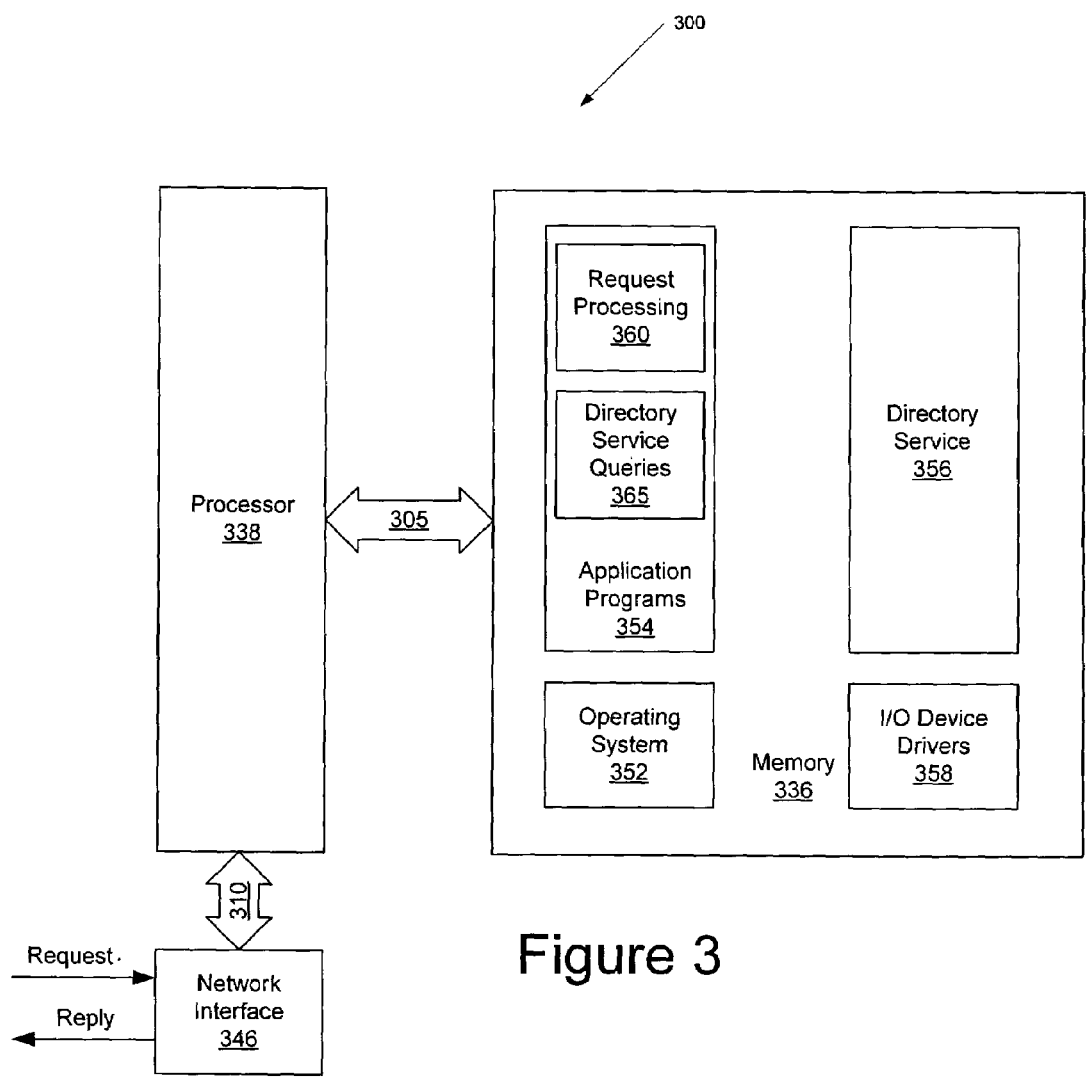
FIG. 3 is a more detailed block diagram of a directory service system for communicating product status information according to some embodiments of the present invention.

FIG. 3 is a block diagram of a directory service system for communicating product status information according to some embodiments of the present invention. The processor 338 communicates with the memory 336 via an address/data bus 305. The processor 338 can be any commercially available or custom microprocessor. The memory 336 is representative of the overall hierarchy of memory devices containing the software and data used to implement the functionality of the data processing system 300. The memory 336 can include, but is not limited to, the following types of devices: cache, ROM, PROM, EPROM, EEPROM, flash memory, SRAM, and DRAM.

As shown in FIG. 3, the memory 336 may include several categories of software and data used in the data processing system 300: the operating system 352; the application programs 354; the input/output (I/O) device drivers 358; and the directory service 356. As will be appreciated by those of skill in the art, the operating system 352 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 358 typically include software routines accessed through the operating system 352 by the application programs 354 to communicate with devices such as the I/O data port(s) 46 and certain memory 336 components. The application programs 354 are illustrative of the programs that implement the various features of the data processing system 300 and preferably include at least one application which supports operations according to embodiments of the present invention. Finally, the directory service 356 may be found in the memory 336 of the data processing system 300 and/or may be a remotely located and maintained in data base or data bases accessible to the data processing system, for example, over the Internet. It will be understood that the memory 336 may include additional data used by the application programs 354, the operating system 352, the I/O device drivers 358, and other software programs that may reside in the memory 336.

As is further seen in FIG. 3, the application programs 354 may include a request processing module 360 and/or a directory services query module 365. The request processing module 360 may carry out the operations described herein for receiving from a requestor a batch status request including a product identification string associated with a product of a user. The product identification string is associated with a corresponding batch of the product and the batch status request may include no personal information of the user. The request processing module 360 may also carry out the operations described herein for transmitting the obtained batch status information for the product to the requestor. As shown in FIG. 3, the processor 338 is coupled to a network interface 346 over a bus 310 and the network interface may be used to receive batch status requests and transmit batch status information replies, for example, over the Internet. The network interface 346 may also be used to access remote directory service(s) where the needed status information is not available locally in the directory service 356.

Also shown in the application programs 354 of FIG. 3 is a directory services queries module 365. The directory service queries module 365 may carry out the operations described herein for querying a directory service 356, including a plurality of records associating product identification strings with batch identifications for corresponding products, to obtain requested batch status information. A product type has a plurality of associated product identification strings associated with different batches of the product type. The corresponding products are provided with a machine readable label including an associated one of the product identification strings.

As noted above, the directory service 356 includes a plurality of records associating product identification strings with batch identifications for corresponding products, wherein a product type has a plurality of associated product identification strings associated with different batches of the product type. The product identification strings may be, for example, bar code values. The records of the directory service 356 may further include status information associated with the different batches and the directory service is coupled through the buses 305, 310 to the network interface 346 by the modules 360, 365 to provide an input interface configured to receive a batch status request from a user and to provide the status information to the user responsive to the received batch status request. The directory service 356 may include records for products from different vendors. Alternatively, the records may be associated with products of a single vendor.

While the present invention is illustrated, for example, with reference to the request processing module 360 being an application program in FIG. 3, as will be appreciated by those of skill in the art, other configurations may also be utilized while still benefitting from the teachings of the present invention. For example, the request processing module 360 may also be incorporated into the operating system 352, the I/O device drivers 358 or other such logical division of the data processing system 300. Thus, the present invention should not be construed as limited to the configuration of FIG. 3 but is intended to encompass any configuration capable of carrying out the operations described herein.

While embodiments of the present invention are described herein with reference to particular systems illustrated in FIGS. 1-3, the present invention should not be construed as limited to such systems. Thus, for example, embodiments of the present invention may be provided in a stand-alone application, as part of a consumer appliance or as part of a directory service system. Accordingly, the present invention should not be construed as limited to a particular system configuration but may be utilized in any system capable of carrying out the operations described herein.

Figure 4:
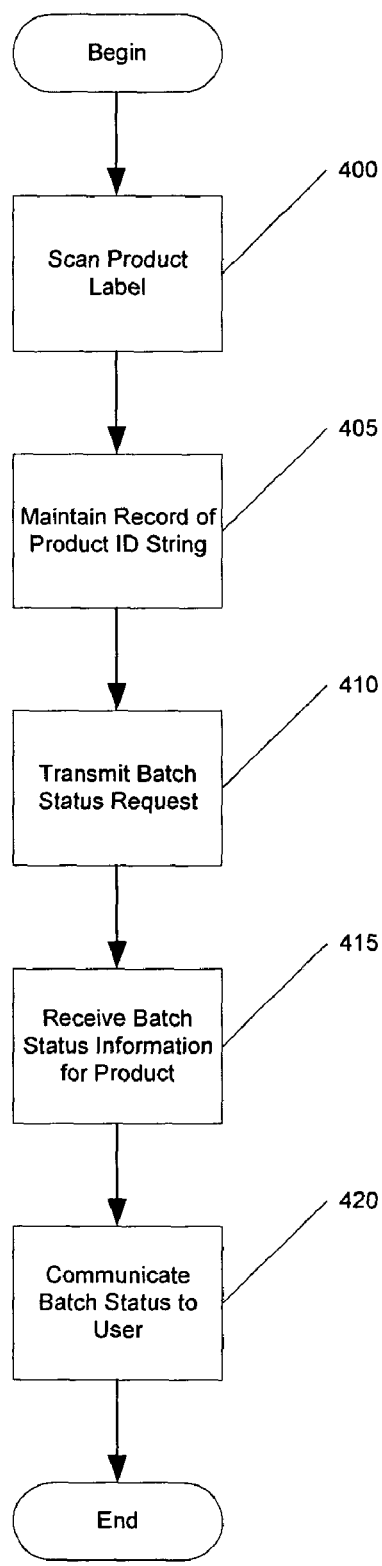
FIG. 4 is a flowchart illustrating operations for communicating product status information according to some embodiments of the present invention.

Operations according to embodiments of the present invention will now be described with reference to the flowcharts of FIGS. 4 through 8. FIG. 4 is a flowchart illustrating operations that may be carried out according to some embodiments of the present invention for communicating product status information. As shown in FIG. 4, operations related to communicating product status information may begin by scanning a product label of the product to obtain a product identification string (Block 400). As used herein, "scanning" includes receiving wireless transmission of the product identification string, for example, from an RF tag transmitting such information as well as optical reading, magnetic reading and the like. A record of the product identification string associated with the product of the user is maintained (Block 405). As noted above and will be discussed further herein, the product identification string is associated with the corresponding batch of the product, not just the product brand and/or model. Operations at Block 405 may include merely maintaining a temporary record of the product identification string while transmitting a batch status request (as will be described with reference to Block 410). hi alternative embodiments of the present invention, a plurality of records with product identification strings associated with different products of the user are maintained at Block 405.

The batch status request is transmitted to a directory service maintaining batch status information (Block 410). A batch status request may be transmitted at selected intervals and/or responsive to a user request. For example, the batch status request for a product identification string may be transmitted responsive to scanning of the product label at Block 400. To protect the privacy of a user, the batch status request transmitted at Block 410 may include no personal information of the user. Thus, the batch status request may include minimal identification information allowing the directory service to route the responsive batch status information to the correct requesting user. Furthermore, additional protection of the privacy of the user may be provided by use of a registered intermediary that is trusted by the user so that not even an address of the user need be provided to the directory service maintaining the batch status information.

The requested batch status information for the product is received (Block 415). For example, the information may be received over an internet connection to a consumer appliance maintained by the user requesting the batch status information. The requested batch status information may then be communicated to the user (Block 420). For example, the batch status information may indicate a recall of the product and the user may be notified of the recall at Block 420. In other embodiments, the batch status information may indicate that a "Use By" or other expiration date has passed and the product should no longer be used.

The directory service receiving the batch status request and providing the batch status information responsive to the request may be a plurality of sources maintained by different respective manufacturers. In other embodiments of the present invention, a trusted entity is utilized to provide the requested batch status information responsive to the batch status request transmitted to the trusted entity. In such embodiments, a user may register with the trusted entity and batch status requests for products of different manufacturers may be sent to the trusted entity with the requested batch status information provided to the user by the trusted entity. By way of example, a consumer organization, such as Consumer Reports, may operate the directory service containing the batch information cross referenced to product identification strings and may gather recall information from a variety of different manufacturers to maintain an up to date directory service database of products status information.

To further provide secure communication and verification of product status information, the received batch status information may include a certification of the trusted entity. Furthermore, the received batch status information may also include a signature of an inspecting authority generating the batch status information. Either such certification or signature may provide assurances to the user of the reliability of the received batch status information. Similarly, where different entities maintain directory service databases for different products, the received batch status information from respective ones of the different entities may also include a certification of the different entities to provide assurance of the veracity of the received information and may likewise include signatures of an inspecting authority generating the batch status information.

Figure 5:
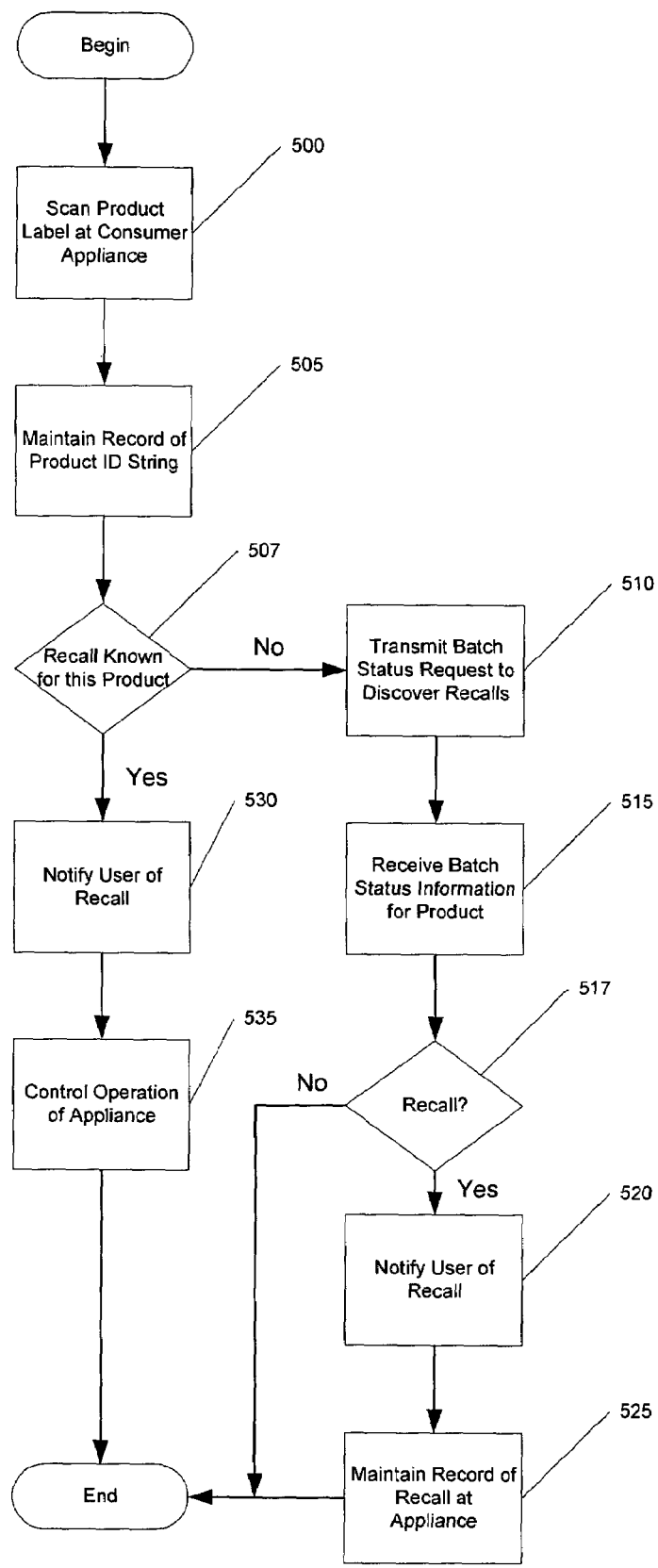
FIG. 5 is a flowchart illustrating operations for communicating recall information using a consumer appliance according to some embodiments of the present invention.

Referring now to FIG. 5, operations for further embodiments of the present invention utilizing a consumer appliance for communicating product status information to a user will now be described. Operations begin at Block 500 when the product label is scanned at the consumer appliance. The consumer appliance may be an integrated unit including both the scanning capability and another consumer function, such as a cooking device or food storage device. Alternatively, a separate scanning device, which may be coupled to one or more consumer appliances, may be provided or the consumer appliance may be an information appliance including memory and program capabilities operatively coupled to a scanner interface. According to embodiments illustrated in FIG. 5, the consumer appliance, either locally or remotely, maintains a record of product identification strings associated with one or more products of the user (Block 505).

FIG. 5 particularly illustrates embodiments of the present invention including a consumer appliance that maintains recall information for a product. For example, the consumer appliance may be a cooking appliance and it may be desirable to prevent a user from attempting to prepare a recalled food product without the necessity of querying a directory service each time a user attempts to place a product in the cooking appliance. Accordingly, as shown at Block 507 of FIG. 5, the consumer appliance determines if there is a known recall of the scanned product. If there is no record of a known recall (Block 507), a batch status request is sent to discover if there have been any recalls for the product (Block 510). The batch status information for the product is received responsive to the batch status request (Block 515). If the batch status information indicates a recall (Block 517), the user is notified of the recall (Block 520). The recall information is maintained as a record of the recall at the consumer appliance (Block 525). The record maintained at Block 525 is then available for detection at Block 507.

If a known recall is already of record for the product (Block 507), the user is notified of the recall (Block 530). In some embodiments of the present invention where a recall affects the product, the consumer appliance may have its operations controlled based on the existence of the recall (Block 535). Thus, for example, a product label may be scanned if a user attempts to cook the product in the cooking appliance and a user of the cooking appliance may be notified of a recall if a user attempts to cook a recalled product in the cooking appliance. Furthermore, the cooking appliance, in some embodiments, is controlled to prevent the user from being able to cook a recalled product. Similarly, the consumer appliance may be a food storage appliance and a user may be notified of recalls at the time the user attempts to store a recalled product in the food storage appliance.

Figure 6:
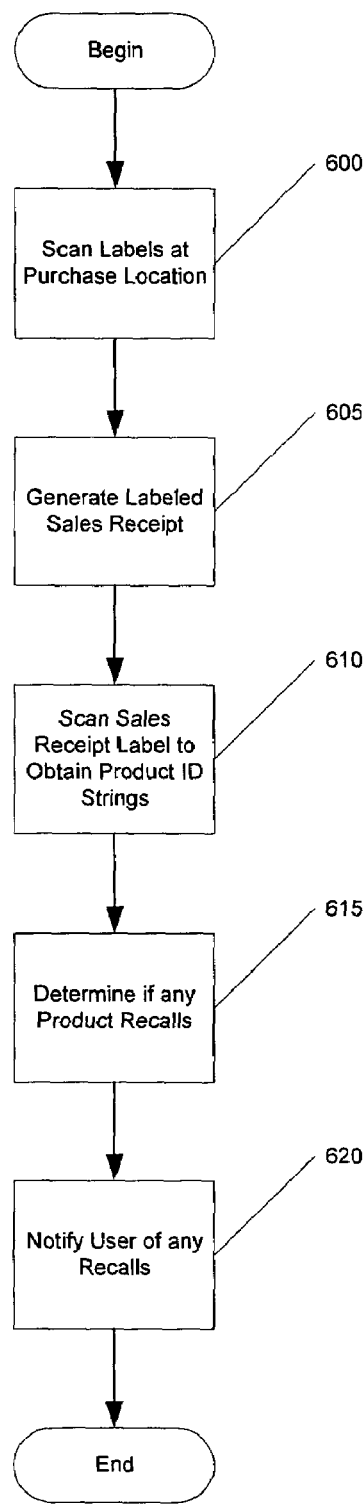
FIG. 6 is a flowchart illustrating operations for communicating product status information using labeled sales receipts according to some embodiments of the present invention.

Further embodiments of the present invention will now be described with reference to the flow chart diagram of FIG. 6. FIG. 6 illustrates operations for communicating product status information using labeled sales receipts according to some embodiments of the present invention. Operations begin at Block 600 by scanning a plurality of machine readable labels associated with products of a user at a purchase location. A sales receipt including a machine readable label configured to allow retrieval of the product identification strings for the scanned plurality of machine readable labels is generated (Block 605). The machine readable label of the sales receipt is subsequently scanned by a user to obtain the product identification strings for the scanned plurality of machine readable labels (Block 610). It is then determined, for example, using embodiments of the present invention as described previously with reference to FIG. 4 and FIG. 5, if any product recalls affect any of the product batches identified by the product identification strings (Block 615). The user is then notified of any such recalls (Block 620).

Figure 7:
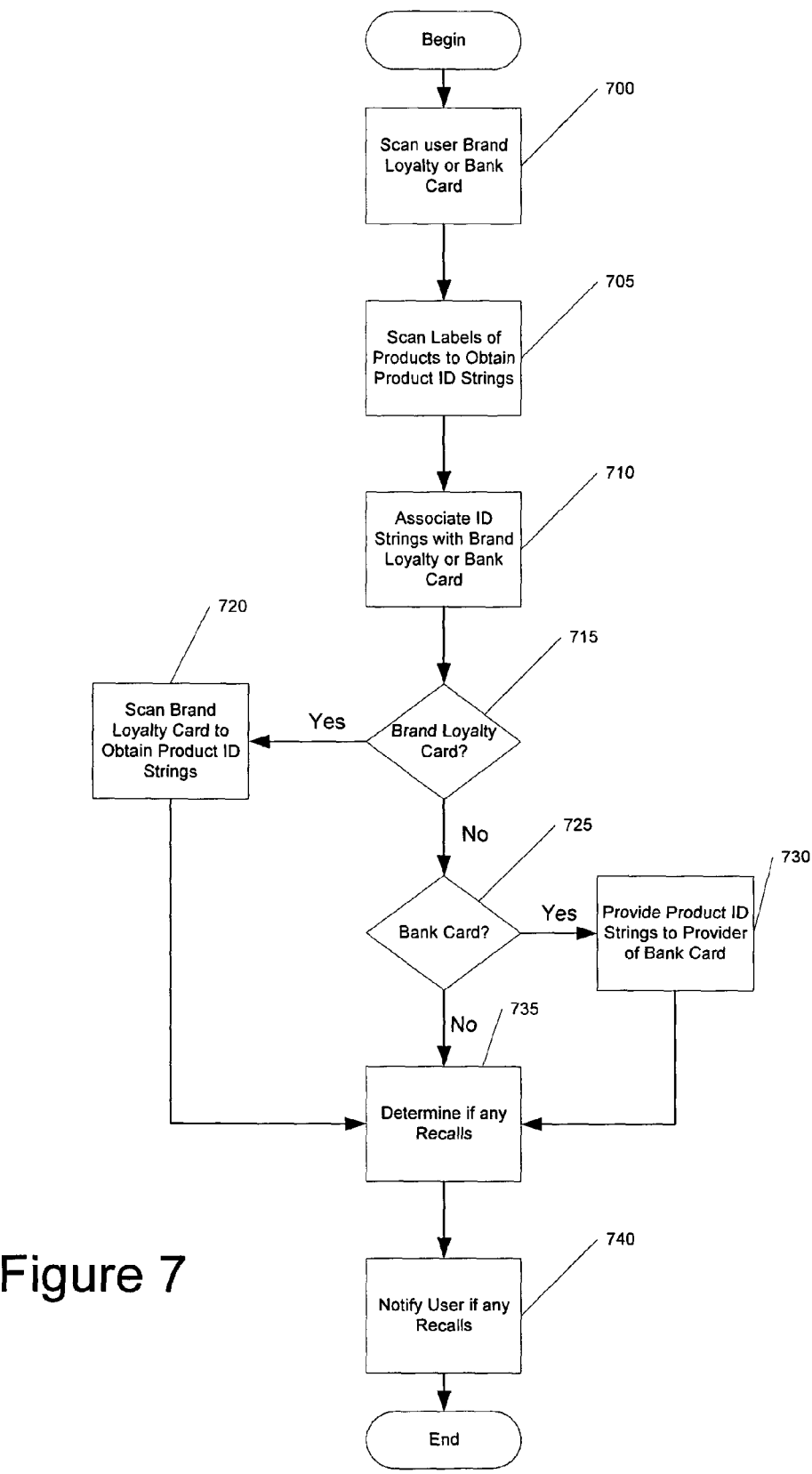
FIG. 7 is a flowchart illustrating operations for communicating product status information using brand loyalty cards and/or bank cards according to some embodiments of the present invention.

Further embodiments of the present invention will now be described with reference to FIG. 7. FIG. 7 is a flow chart illustrating operations for communicating product status information using brand loyalty cards and/or bank cards according some embodiments of the present invention. Brand loyalty cards as used herein refers to identification cards commonly used by various retailers and/or wholesalers such as grocery stores, discount warehouses, hardware stores and the like. Bank cards as used herein refers to credit and/or debit cards that may be provided by banks and/or other organizations having financing operations, such as auto companies or retailers. In other words, as used herein, the term "bank cards" is not limited to cards issued by entities characterized as banks by the regulations of any country but is intended to encompass any organization providing credit and/or debit processing services based on a card or other machine readable device utilized by the consumer.

Operations begin at Block 700 by scanning a user brand loyalty card and/or bank card at a purchase location. A plurality of machine readable labels associated with products of the user are also scanned at the purchase location (Block 705). The product identification strings for the scanned plurality of machine readable labels are associated with the scanned user brand loyalty card and/or bank card to allow retrieval of the product identification strings for the scanned plurality of machine readable labels (Block 710).

If a brand loyalty card was scanned at Block 700 (Block 715), a user subsequently scans the user brand loyalty card to obtain the product identification strings for the scanned plurality of machine readable labels and maintains a record including the obtained product identification strings (Block 720). A user may then determine any recalls or other batch status information for the obtained product identification strings (Block 735). If a bank card was scanned at Block 700 (Block 725), the product identification strings of the scanned plurality of machine readable labels are obtained from the provider of the bank card and the record of the obtained product identification strings is maintained (Block 730). A user may then determine any recalls or other batch status information for products associated with the product identification strings obtained from the provider of the bank card (Block 735). A user may then be notified of any batch status information, such as recalls (Block 740).

Figure 8:
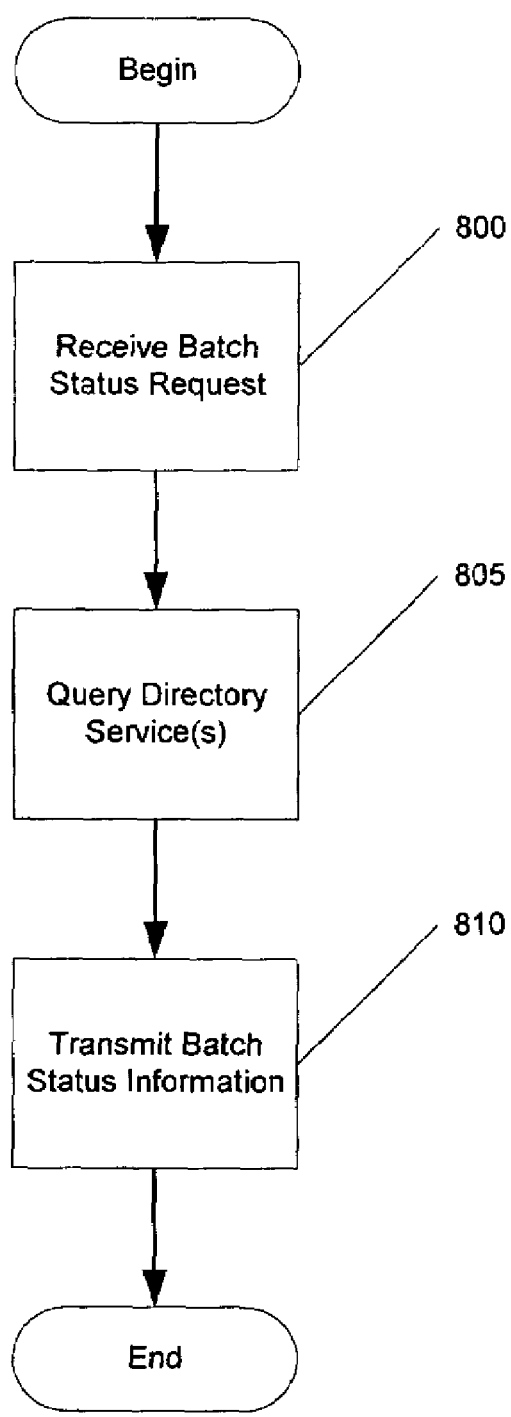
FIG. 8 is a flowchart illustrating operations for communicating product status information using a directory service according to some embodiments of the present invention.

Operations for further embodiments of the present invention from the perspective of the directory service will now be described with reference to FIG. 8. FIG. 8 is a flowchart illustrating operations for communicating product status information using a directory service according to some embodiments of the present invention. Operations begin at Block 800 with receipt from a requestor of a batch status request including a product identification string associated with the product of the user. As noted previously, the product identification string is associated with the corresponding batch of the product, not simply the brand and/or model of the product. The batch status request need include no personal information of the user. A directory service including a plurality of records associating product information strings with batch identifications for corresponding products is queried to obtain to the requested batch status information (Block 805). The obtained batch status information for the product is transmitted to the requester (Block 810).

As described above, extending the information associated with the product identification string, such as a UPC bar code label, to include a batch number provides for novel systems methods and computer program products for communicating product status information that may allow personal information of a user to be maintained in a more confidential manner than with conventional product registration techniques while still providing more reliable notification of recalls and other such product information than mass market communications. For example, a microwave oven could, via push technology or programmed replication, periodically obtain recall information about food products. If a batch of beef was determined to have *e-coli,* consumers could scan the food, with or without the intention of using the microwave to prepare it, and be assured that there is no current recall on that batch of beef. Furthermore, a microwave oven can be provided that remembers batch information to warn users prior to consumption or after consumption of any such recall event.

The benefits of the present invention can be provided to consumer goods beyond food products. For example, concerned parents could retain and swipe their car seat UPC labels periodically to determine if any recall has occurred. Alternatively, various products could be scanned and registered, for example, at the time of purchase, in a microwave or other information appliance to allow detection of a recall at a scheduled interval or otherwise determined future time without the need to continuously re-scan the bar code to trigger checking product status.

In addition a grocery store or other retailer could generate store receipts containing machine readable codes that may be used to proactively retrieve all information on purchased items for proactive notification. Likewise, a user's branded loyalty card can be scanned to avoid the need for generation and scanning of sales receipts. Similarly, credit card companies could generate repositories of this purchase information on behalf of the consumer.

Associated directory services containing the necessary product status information may be provided by and/or for suppliers, distributors, manufacturers and/or retailers either by these companies or by some other trusted entity. Certification of the information may be provided to avoid communication of false information, which could lead to consumer scares on product recalls. The inspecting authorities may also provide an electronic signature to information on batches to further assure the veracity of the provided batch information. Services in accordance with the present invention may be provided for a fee by various providers and/or in exchange for receiving batch and/or individual item numbers by the retailers and/or manufactures.

The flowcharts and block diagrams of FIGS. 1 through 8 illustrate the architecture, functionality, and operation of possible implementations of systems, methods and computer program products for communicating product status information according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

The invention claimed is:

1. A directory service comprising a plurality of records associating product identification strings with batch identifications for corresponding products, wherein a product type has a plurality of associated product identification strings associated with different batches of the product type and wherein the corresponding products are provided with a machine readable label including an associated one of the product identification strings and wherein the directory services include records for products from different vendors;
   a directory services query module that is configured to identify a vendor associated with a received batch status request and determine if corresponding records for the identified vendor are available locally and to identify a remote directory service having the corresponding records independent of information contained in the received batch status request; and
   a network interface that is configured to access the remote directory service having the corresponding records based on the identification of the remote directory service.

2. The directory service of claim 1 wherein the product identification strings comprise bar code values and the machine readable labels comprise bar code labels.

3. The directory service of claim 1 wherein the records further comprise status information associated with the different batches and wherein the directory services query module is configured to receive the batch status request from a user and to provide the status information to the user responsive to the received batch status request.

4. A method of communicating product status information comprising:
   maintaining a record of a product identification string associated with a product of a user, the product identification string being associated with a corresponding batch of the product;
   transmitting a batch status request to a directory service maintaining batch status information at selected intervals and/or responsive to a user request; and
   receiving the requested batch status information for the product, wherein the received batch status information includes a certification of a trusted entity providing the batch status information and/or a signature of an inspecting authority generating the batch status information.

5. The method of claim 4 wherein the batch status request includes no personal information of the user.

6. The method of claim 4 further comprising scanning a product label of the product to obtain the product identification string.

7. The method of claim 6 wherein transmitting a batch status request comprises transmitting a batch status request for the product identification string responsive to scanning of the product label.

8. The method of claim 7 wherein maintaining a record comprises maintaining a temporary record of the product identification string while transmitting the batch status request.

9. The method of claim 6 wherein receiving the requested batch status information is followed by communicating the batch status information to the user.

10. The method of claim 9 wherein the batch status information indicates a recall of the product and wherein communicating the batch status information to the user comprises notifying the user of the recall.

11. The method of claim 6 wherein maintaining a record comprises maintaining a plurality of records of product identification strings associated with a plurality of products of the user.

12. The method of claim 11 further comprising registering the user with the trusted entity and wherein transmitting a batch status request comprises transmitting batch status requests for the plurality of products to the trusted entity and receiving the requested batch status information comprises receiving batch status information for the plurality of products from the trusted entity.

13. The method of claim 12 wherein the received batch status information includes the certification of the trusted entity.

14. The method of claim 12 wherein the received batch status information includes the signature of the inspecting authority generating the batch status information.

15. The method of claim 11 wherein transmitting a batch status request comprises transmitting batch status requests for different ones of the products to different entities and wherein receiving the requested batch status information comprises receiving batch status information for respective products from the different entities, and wherein the received batch status information includes certifications of a plurality of the different entities.

16. The method of claim 15 wherein the received batch status information includes the signature of an inspecting authority generating the batch status information.

17. The method of claim 6 wherein scanning a product label comprises scanning the product label using a consumer appliance.

18. The method of claim 17 wherein the consumer appliance comprises a cooking appliance and wherein receiving the batch status information is followed by notifying the user if the batch status information indicates a recall of the product.

19. The method of claim 18 further comprising maintaining a record of recalled products at the cooking appliance and wherein scanning a product label comprises scanning the product label if a user attempts to cook the product in the cooking appliance and wherein the method further comprises notifying a user of the cooking appliance of a recall if a user attempts to cook a recalled product in the cooking appliance.

20. The method of claim 17 wherein the consumer appliance comprises a food storage appliance and wherein receiving the batch status information is followed by notifying the user if the batch status information indicates a recall of the product.

21. The method of claim 20 further comprising maintaining a record of recalled products at the food storage appliance and wherein scanning a product label comprises scanning the product label if a user attempts to store the product in the food storage appliance and wherein the method further comprises notifying a user of the food storage appliance of a recall if a user attempts to store a recalled product in the food storage appliance.

22. The method of claim 17 wherein the consumer appliance comprises an information appliance.

23. A method of communicating product status information comprising:
maintaining a record of a product identification string associated with a product of a user, the product identification string being associated with a corresponding batch of the product;
transmitting a batch status request to a directory service maintaining batch status information at selected intervals and/or responsive to a user request; and
receiving the requested batch status information for the product;
wherein maintaining a record comprises maintaining a plurality of records of product identification strings associated with a plurality of products of the user and wherein the method further comprises:
scanning a plurality of machine readable labels associated with the products of the user at a purchase location; and
generating a sales receipt including a machine readable label configured to allow retrieval of the product identification strings for the scanned plurality of machine readable labels.

24. The method of claim 23 further comprising scanning the machine readable label of the sales receipt to obtain the product identification strings for the scanned plurality of machine readable labels and wherein maintaining a record includes maintaining records for the obtained product identification strings.

25. A method of communicating product status information comprising:
maintaining a record of a product identification string associated with a product of a user, the product identification string being associated with a corresponding batch of the product;
transmitting a batch status request to a directory service maintaining batch status information at selected intervals and/or responsive to a user request; and
receiving the requested batch status information for the product;
wherein maintaining a record comprises maintaining a plurality of records of product identification strings associated with a plurality of products of the user and wherein the method further comprises:
scanning a user brand loyalty card and/or bank card at a purchase location;
scanning a plurality of machine readable labels associated with the products of the user at a purchase location; and
associating product identification strings for the scanned plurality of machine readable labels with the scanned user brand loyalty card and/or bank card to allow retrieval of the product identification strings for the scanned plurality of machine readable labels.

26. The method of claim 25 further comprising scanning the user brand loyalty card to obtain the product identification strings for the scanned plurality of machine readable labels and wherein maintaining a record includes maintaining records for the obtained product identification strings.

27. The method of claim 25 further comprising obtaining the product identification strings for the scanned plurality of machine readable labels from a provider of the bank card and wherein maintaining a record includes maintaining records for the obtained product identification strings.

28. A method of communicating product status information comprising:
receiving from a requestor a batch status request including a product identification string associated with a product of a user, the product identification string being associated with a corresponding batch of the product, wherein the batch status request includes no personal information of the use and no identification of a source of batch identification information for the product;
identifying a vendor associated with the product;
identifying a remote directory service that is the source of batch identification information for the product;

querying the remote directory service, which includes a plurality of records associating product identification strings with batch identifications for corresponding products, wherein a product type has a plurality of associated product identification strings associated with different batches of the product type and wherein the corresponding products are provided with a machine readable label including an associated one of the product identification strings, to obtain the requested batch status information; and transmitting the obtained batch status information for the product to the requestor.

29. A system for communicating product status information comprising:

means for maintaining a record of a product identification string associated with a product of a user, the product identification string being associated with a corresponding batch of the product;

means for transmitting a batch status request to a directory service maintaining batch status information at selected intervals and/or responsive to a user request; and means for receiving the requested batch status information for the product, wherein the received batch status information includes a certification of a trusted entity providing the batch status information and/or a signature of an inspecting authority generating the batch status information.

30. The system of claim 29 wherein the batch status request includes no identification of the user.

31. The system of claim 29 further comprising means for scanning a product label of the product to obtain the product identification string.

32. A system for communicating product status information comprising:

means for receiving from a requestor a batch status request including a product identification string associated with a product of a user, the product identification string being associated with a corresponding batch of the product, wherein the batch status request includes no personal information of the user and no identification of a source of batch identification information for the product;

means for identifying a vendor associated with the product;

means for identifying a remote directory service that is the source of batch identification information for the product;

means for querying the remote directory service, which includes a plurality of records associating product identification strings with batch identifications for corresponding products, wherein a product type has a plurality of associated product identification strings associated with different batches of the product type and wherein the corresponding products are provided with a machine readable label including an associated one of the product identification strings, to obtain the requested batch status information; and means for transmitting the obtained batch status information for the product to the requestor.

33. A computer program product for communicating product status information, comprising:

a computer readable medium having computer readable program code embodied therein, the computer readable program code comprising:

computer readable program code configured to maintain a record of a product identification string associated with a product of a user, the product identification string being associated with a corresponding batch of the product;

computer readable program code configured to transmit a batch status request to a directory service maintaining batch status information at selected intervals and/or responsive to a user request; and computer readable program code configured to receive the requested batch status information for the product, wherein the received batch status information includes a certification of a trusted entity providing the batch status information and/or a signature of an inspecting authority generating the batch status information.

34. A computer program product for communicating product status information, comprising:

a computer readable medium having computer readable program code embodied therein, the computer readable program code comprising:

computer readable program code configured to receive from a requestor a batch status request including a product identification string associated with a product of a user, the product identification string being associated with a corresponding batch of the product, wherein the batch status request includes no personal information of the user and no identification of a source of batch identification information for the product;

computer readable program code configured to identify a vendor associated with the product;

computer readable program code configured to identify a remote directory service that is the source of batch identification information for the product;

computer readable program code configured to query the remote directory service, which includes a plurality of records associating product identification strings with batch identifications for corresponding products, wherein a product type has a plurality of associated product identification strings associated with different batches of the product type and wherein the corresponding products are provided with a machine readable label including an associated one of the product identification strings, to obtain the requested batch status information; and computer readable program code configured to transmit the obtained batch status information for the product to the requestor.

* * * * *